US007953965B2

(12) United States Patent
Qin et al.

(10) Patent No.: US 7,953,965 B2
(45) Date of Patent: May 31, 2011

(54) ONE WIRE BOOT LOADER

(75) Inventors: Fugen Qin, Baltimore, MD (US);
Daniele Brotto, Baltimore, MD (US);
Danh Trinh, Parkville, MD (US);
Regina Cunanan, Parkville, MD (US);
Andrew Seman, White Marsh, MD (US)

(73) Assignee: Black & Decker Inc., Newark, DE (US)

( * ) Notice: Subject to any disclaimer, the term of this patent is extended or adjusted under 35 U.S.C. 154(b) by 530 days.

(21) Appl. No.: 12/157,986

(22) Filed: Jun. 13, 2008

(65) Prior Publication Data
US 2008/0313452 A1 Dec. 18, 2008

Related U.S. Application Data

(60) Provisional application No. 60/944,123, filed on Jun. 15, 2007.

(51) Int. Cl.
*G06F 15/177* (2006.01)
(52) U.S. Cl. .................. 713/1; 713/2; 717/171
(58) Field of Classification Search .................. 713/1, 2; 717/171
See application file for complete search history.

(56) References Cited

U.S. PATENT DOCUMENTS

| 6,513,075 | B1 | 1/2003 | Perkel et al. |
| 7,870,379 | B2 * | 1/2011 | Krieger et al. ................. 713/100 |
| 2002/0083427 | A1 | 6/2002 | Li |
| 2005/0182923 | A1 | 8/2005 | Park |
| 2005/0240919 | A1 * | 10/2005 | Kim et al. ...................... 717/168 |
| 2005/0262337 | A1 | 11/2005 | Ziesmer et al. |

* cited by examiner

Primary Examiner — Thuan N Du
(74) Attorney, Agent, or Firm — Harness, Dickey & Pierce, P.L.C.

(57) ABSTRACT

A power tool system component has a microprocessor, a one wire communication terminal connecting the microprocessor to an external device, and a flash memory storing: (a) an application program governing operation of an application mode during which the power tool system component is operated; and (b) a boot loader program governing operation of a boot loader mode during which at least part of the application program can be updated. The microprocessor accesses the flash memory and implements the boot loader program and the application program by setting up and observing a temporal window during which one or more predetermined conditions must be met for the boot loader mode to be entered. The predetermined conditions include successful completion of a calibration process that includes sending a calibration byte to the external device according to a format predetermined to allow the external device to adjust its baud rate for sending and receiving information. Upon successful completion of the conditions within the temporal window, the microprocessor sends a confirmation to the device that the conditions have been satisfied and enters the boot loader mode.

20 Claims, 8 Drawing Sheets

ONE WIRE BOOT LOADER

CROSS-REFERENCE TO RELATED APPLICATIONS

This application claims the benefit of U.S. Provisional Application No. 60/944,123 filed on Jun. 15, 2007. The disclosure of the above application is incorporated herein by reference.

The present disclosure generally relates to updating or reading product firmware post product assembly.

BACKGROUND

For today's products that employ microcontrollers, it is useful to have field reprogram capability. This useful utility extends to being able to simply extract information such as data logged info. Such capability can be accomplished with a program utility typically called a boot loader.

A boot loader is a code segment that resides within the device's microcontroller executable memory. The code provides capability to read or write executable or non-executable memory. While boot loader capability is useful, the capability necessitates a signal containing new program information to be interpreted by the device to be programmed.

The statements in this section merely provide background information related to the present disclosure and may not constitute prior art.

SUMMARY

A power tool system component has a microprocessor, a one wire communication terminal connecting the microprocessor to an external device, and a flash memory storing: (a) an application program governing operation of an application mode during which the power tool is operated; and (b) a boot loader program governing operation of a boot loader mode during which at least part of the application program can be updated. The microprocessor accesses the flash memory and implements the boot loader program and the application program by setting up and observing a temporal window during which one or more predetermined conditions must be met for the boot loader mode to be entered. The predetermined conditions include successful completion of a calibration process that includes sending a calibration byte to the external device according to a format predetermined to allow the external device to adjust its baud rate for sending and receiving information. Upon successful completion of the conditions within the temporal window, the microprocessor sends a confirmation to the device that the conditions have been satisfied and enters the boot loader mode.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
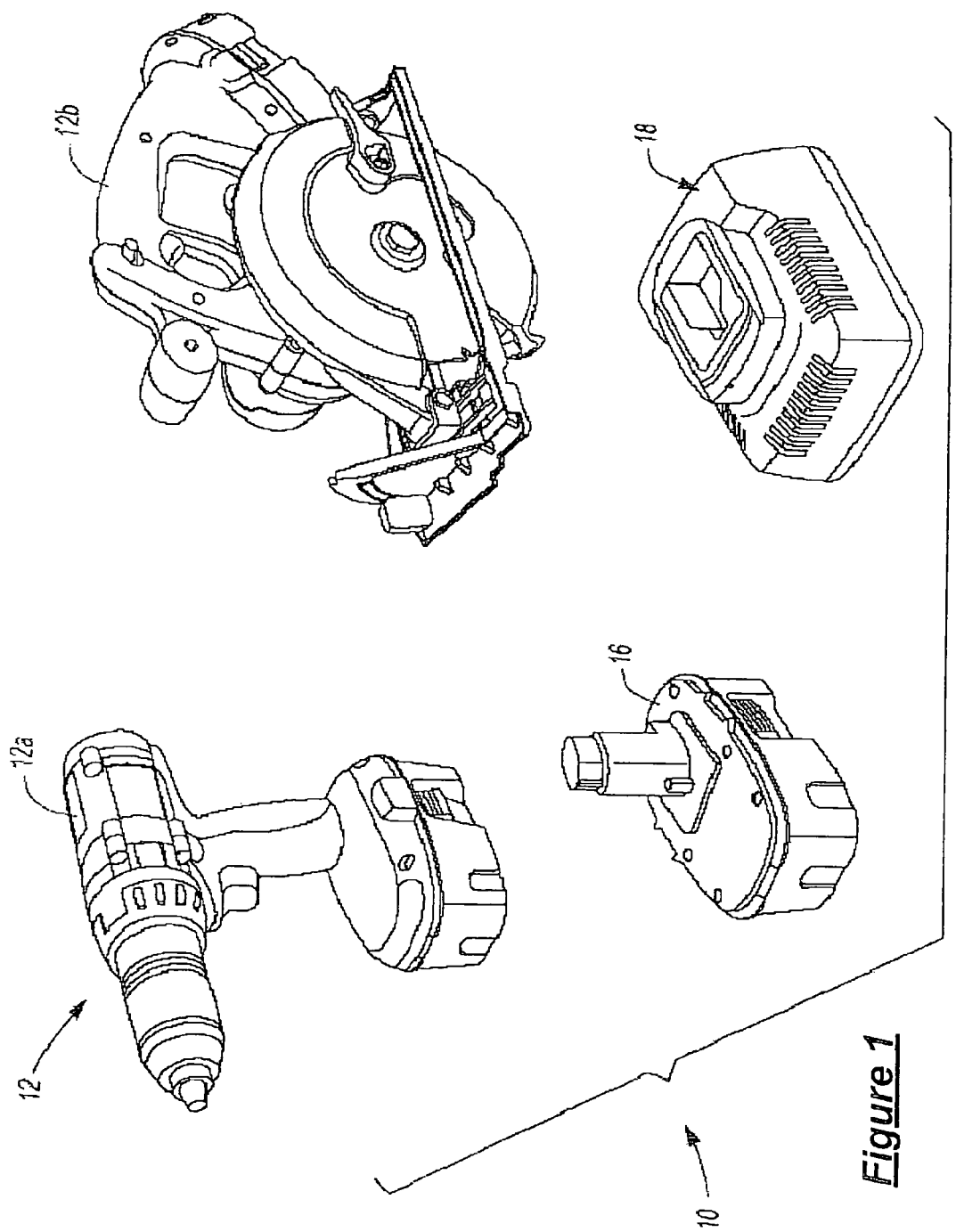
FIG. 1 is a perspective view illustrating power tools.

The present disclosure can relate to a system of power tools of the type that is generally indicated by reference numeral 10 in FIG. 1. The system of power tools 10 can include, for example, one or more power tools 12, a battery pack 16 and a battery pack charger 18. Each of the power tools 12 can be any type of power tool, including without limitation drills, drill/drivers, hammer drill/drivers, rotary hammers, screwdrivers, impact drivers, circular saws, jig saws, reciprocating saws, band saws, cut-off tools, cut-out tools, shears, sanders, vacuums, lights, routers, adhesive dispensers, concrete vibrators, lasers, staplers and nailers. In the particular example provided, the system of power tools 10 includes a first power tool 12a and a second power tool 12b. For example, the first power tool 12a can be a drill/driver similar to that which is described in U.S. Pat. No. 6,431,289, while the second power tool 12b can be a circular saw similar to that which is described in U.S. Pat. No. 6,996,909. The battery pack 16 can be selectively removably coupled to the first and second power tools 12a and 12b to provide electrical power thereto. Except as otherwise described herein, the battery pack 16 can be configured in a manner that is similar to that which is described in U.S. Patent Application Publication No. 2006/0096771. The battery pack 16 can also be selectively electrically coupled to the battery pack charger 18 to charge the battery pack 16. Except as otherwise described herein, the battery pack charger 18 can be configured in a manner that is similar to that which is described in U.S. patent application Ser. No. 11/553,355. The teachings of the aforementioned patent application and patent application publication are incorporated herein by reference in their entirety for any purpose.

Figure 2:
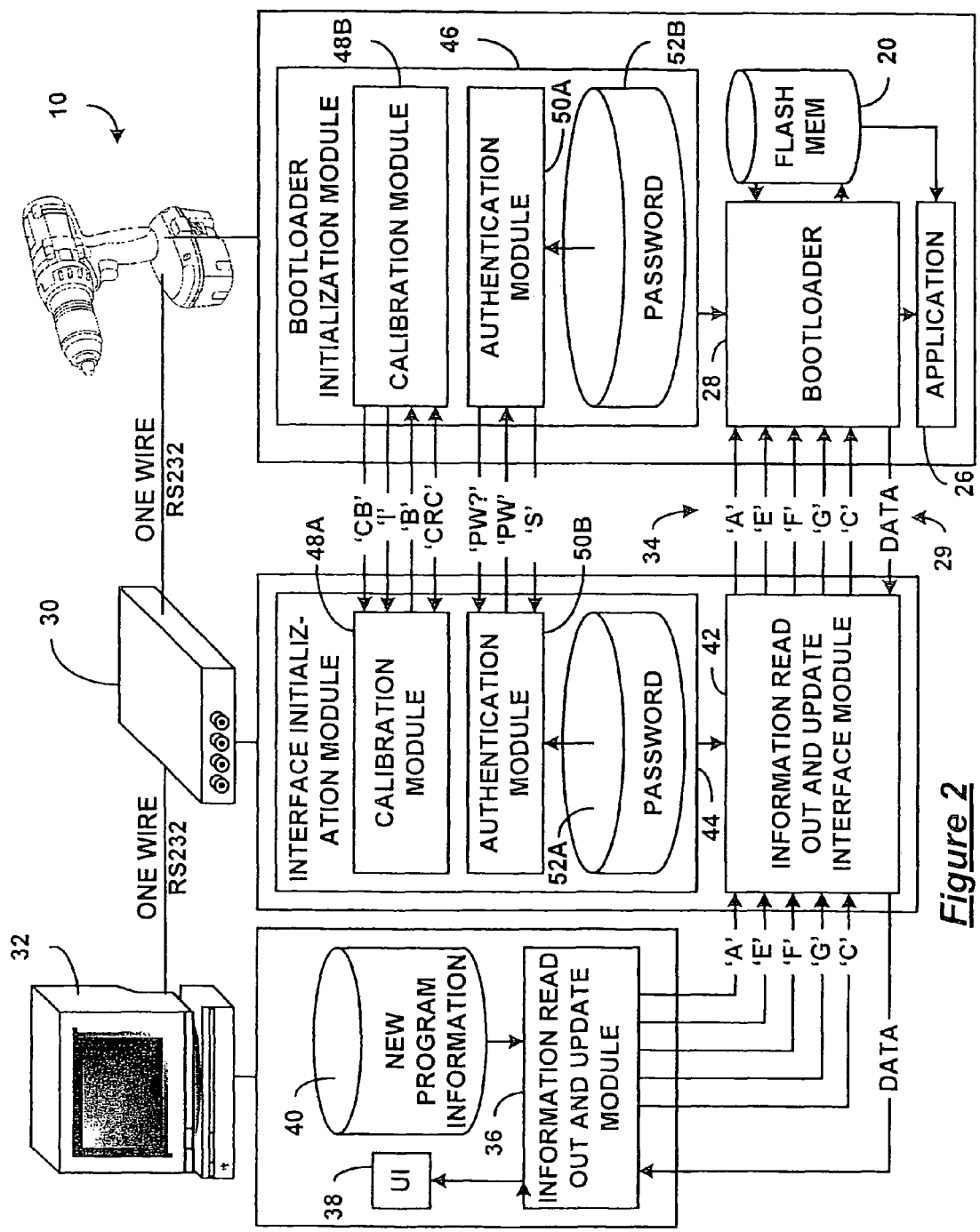
FIG. 2 is a functional block diagram illustrating a one-wire boot loader system.
Figure 3A:
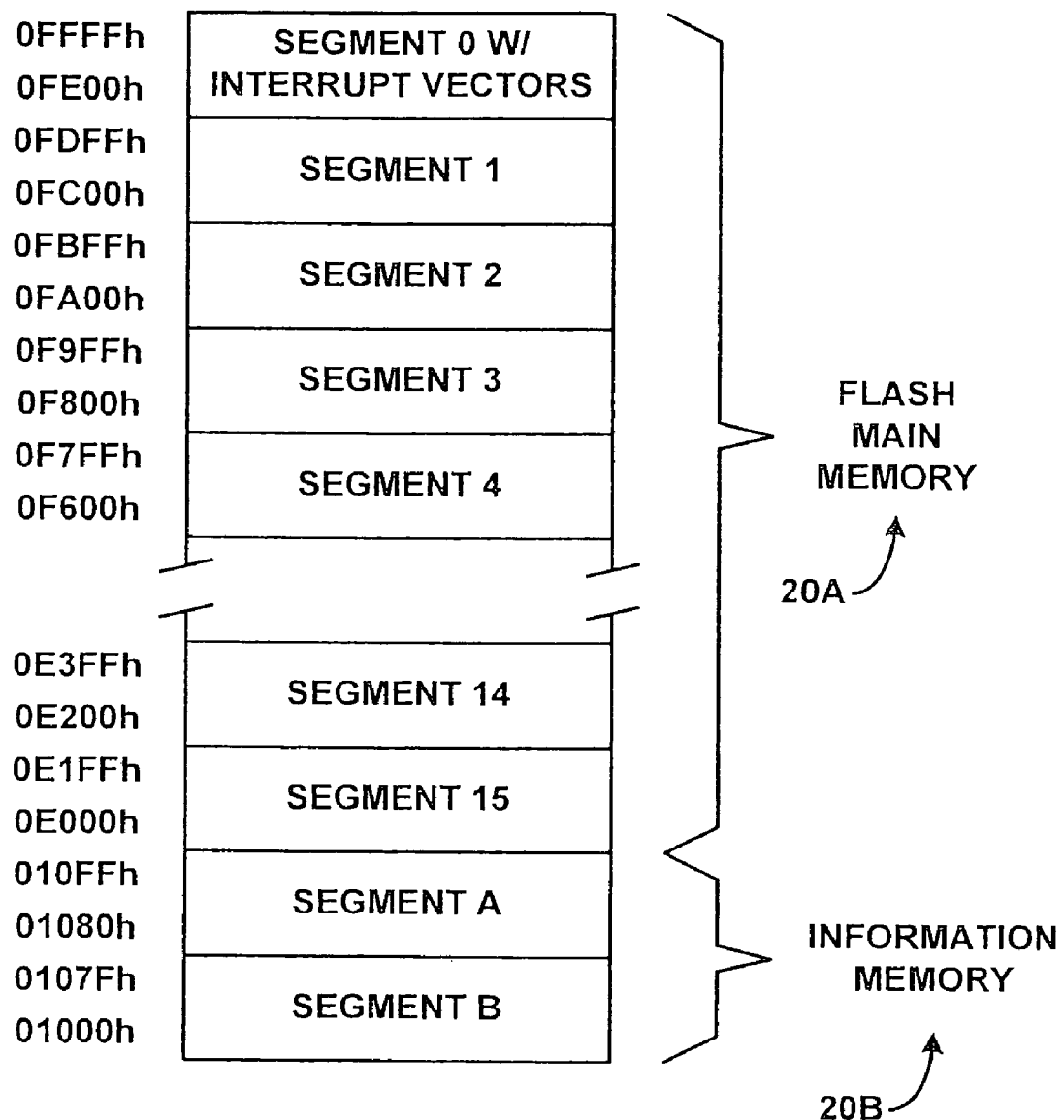
FIG. 3a is a block diagram illustrating flash memory segments apportioned to main memory and information memory.
Figure 3B:
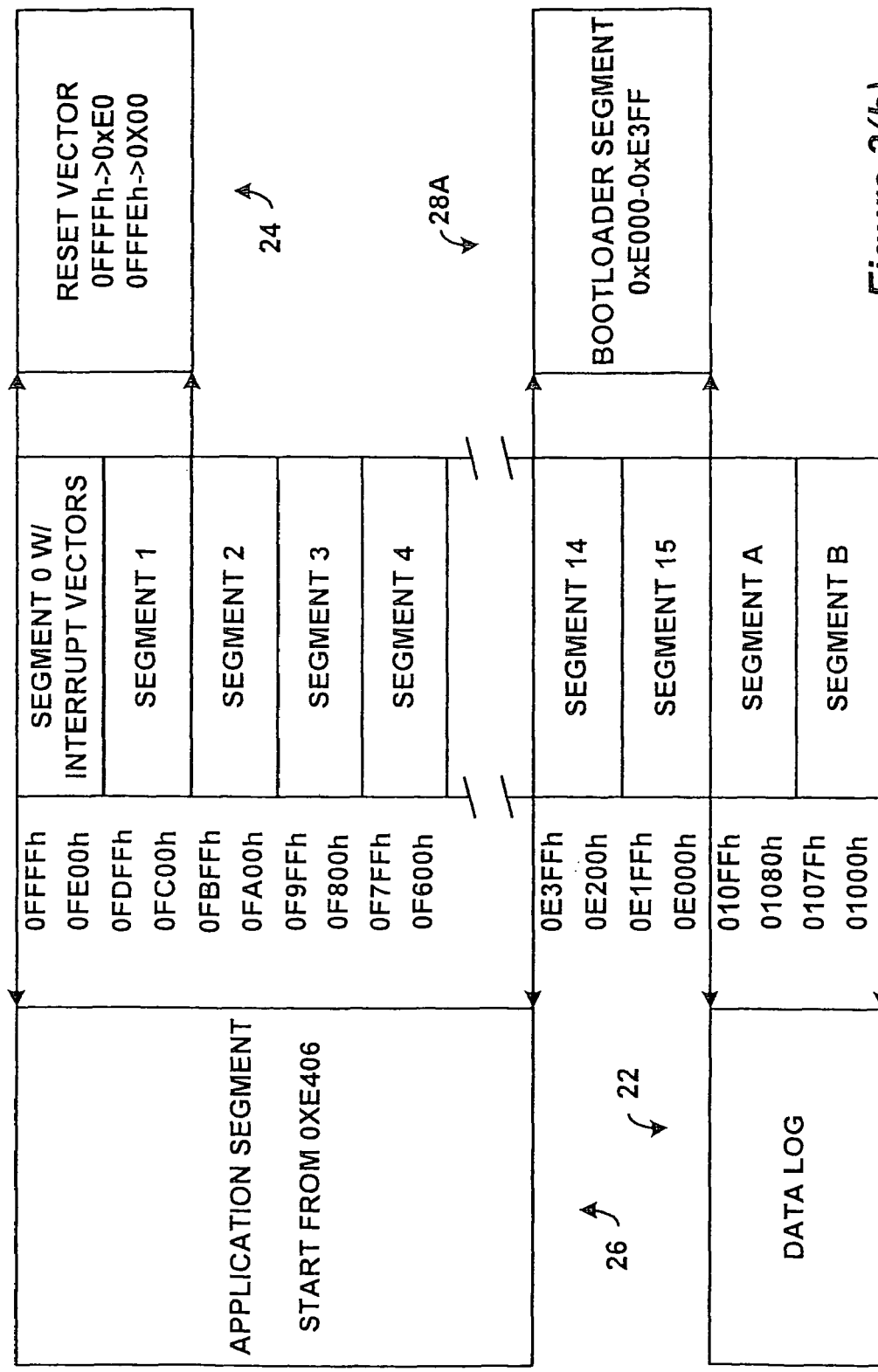
FIG. 3b is a block diagram illustrating contents of flash memory segments.
Figure 4:
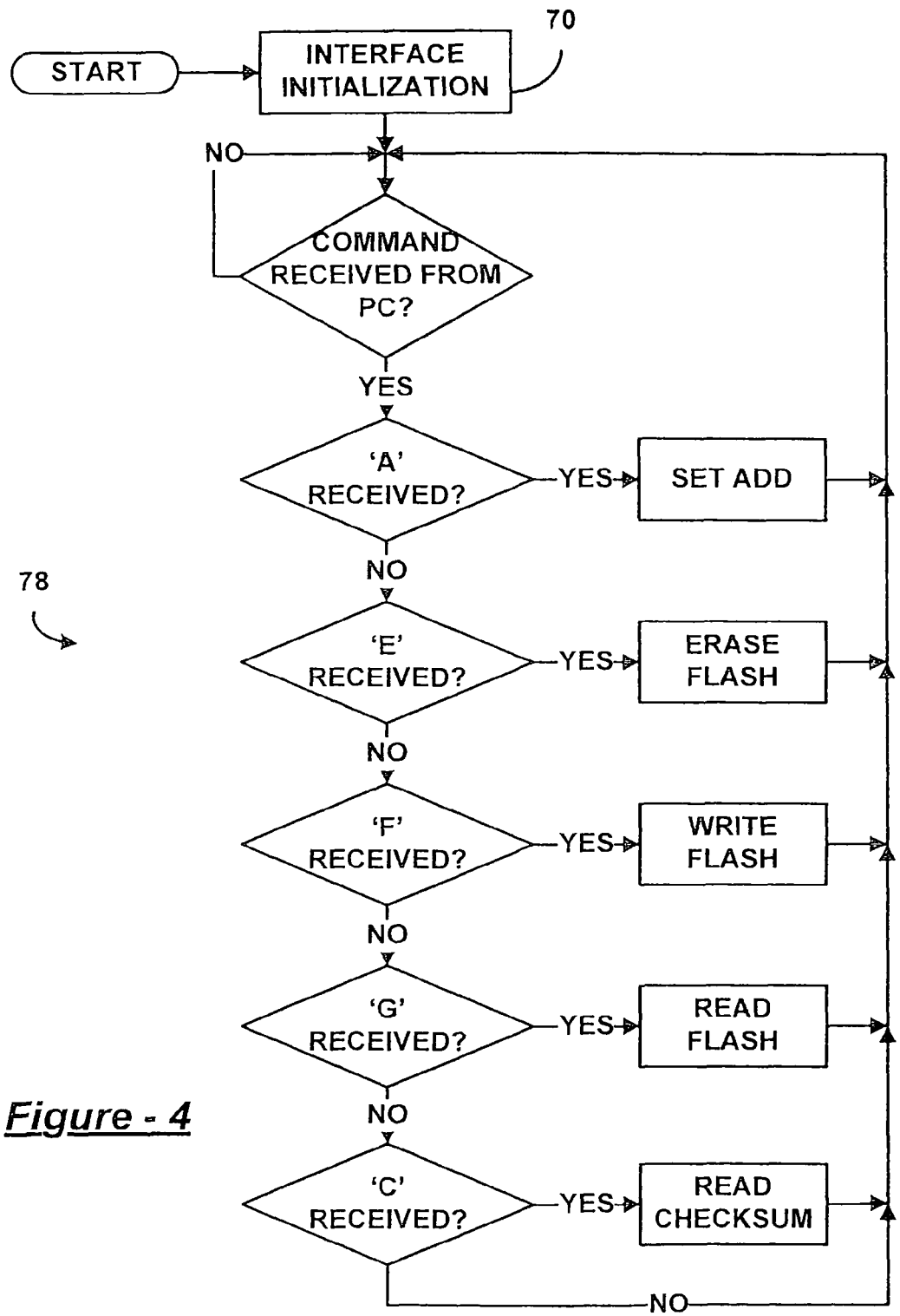
FIG. 4 is a flow diagram illustrating a one wire boot loader method of operation for a one wire boot loader interface.
Figure 5A:
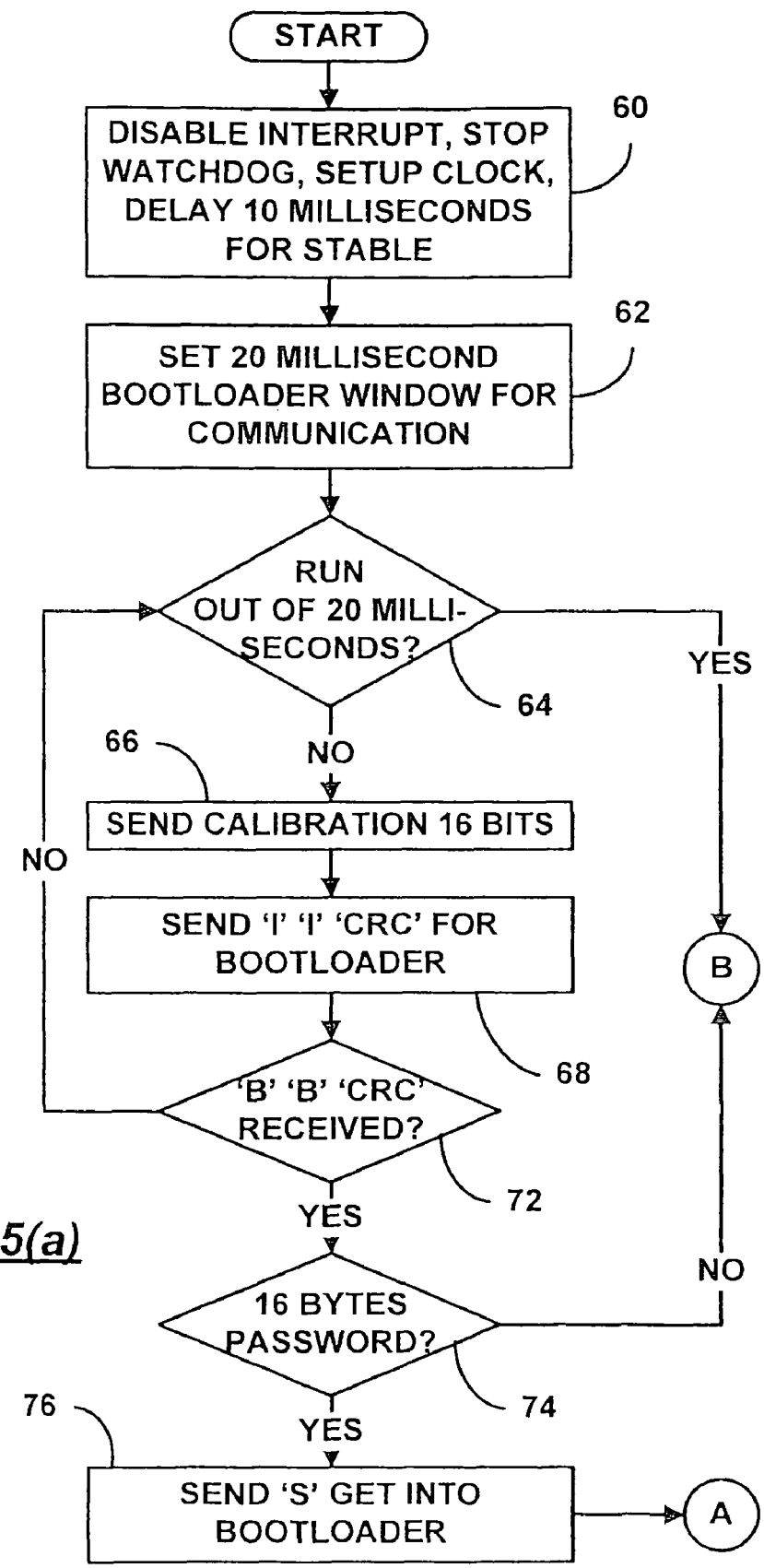
FIGS. 5a-5c are flow diagrams illustrating a one wire boot loader method of operation for a power tool.
Figure 5B:
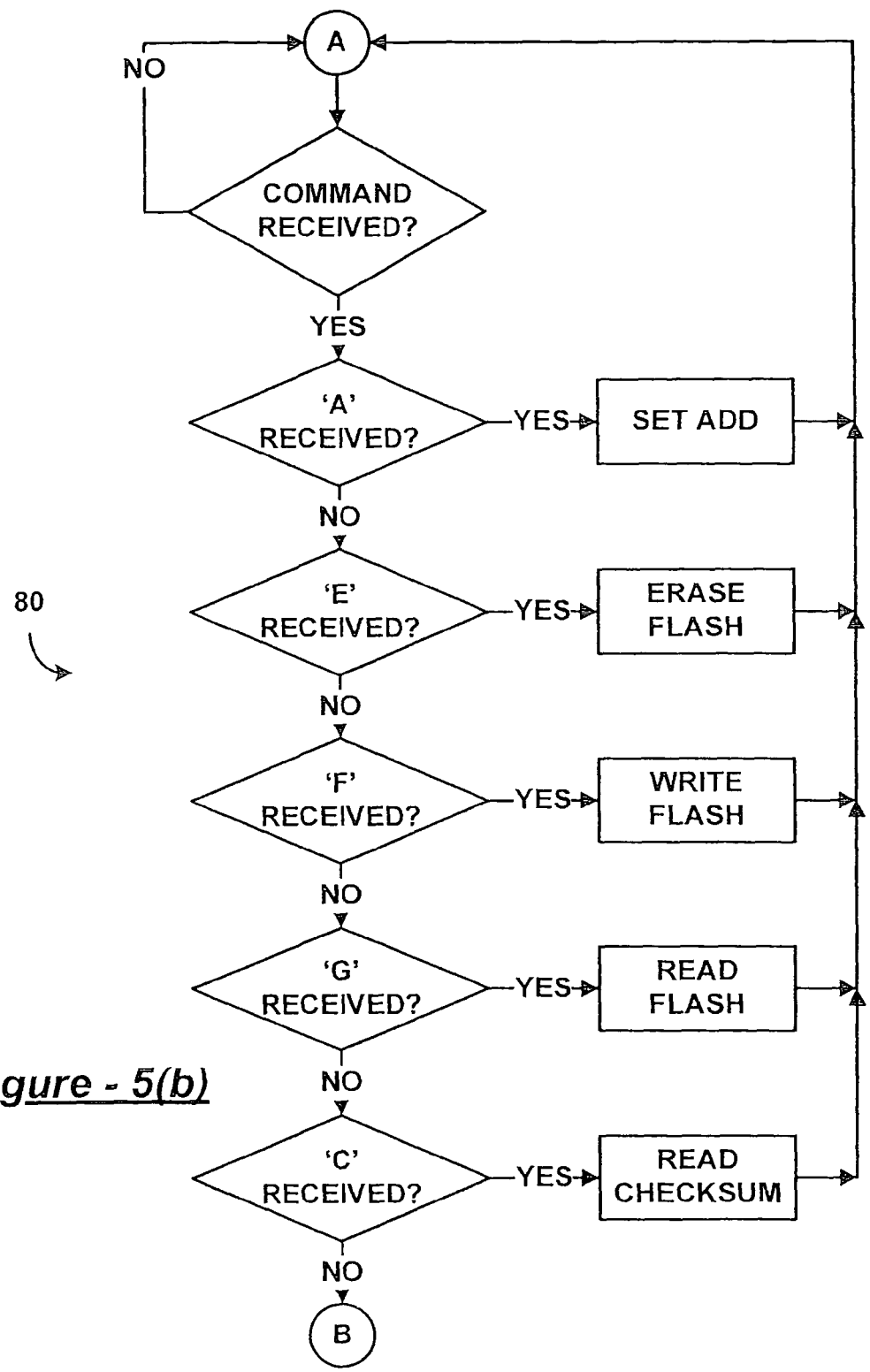
Figure 5C:
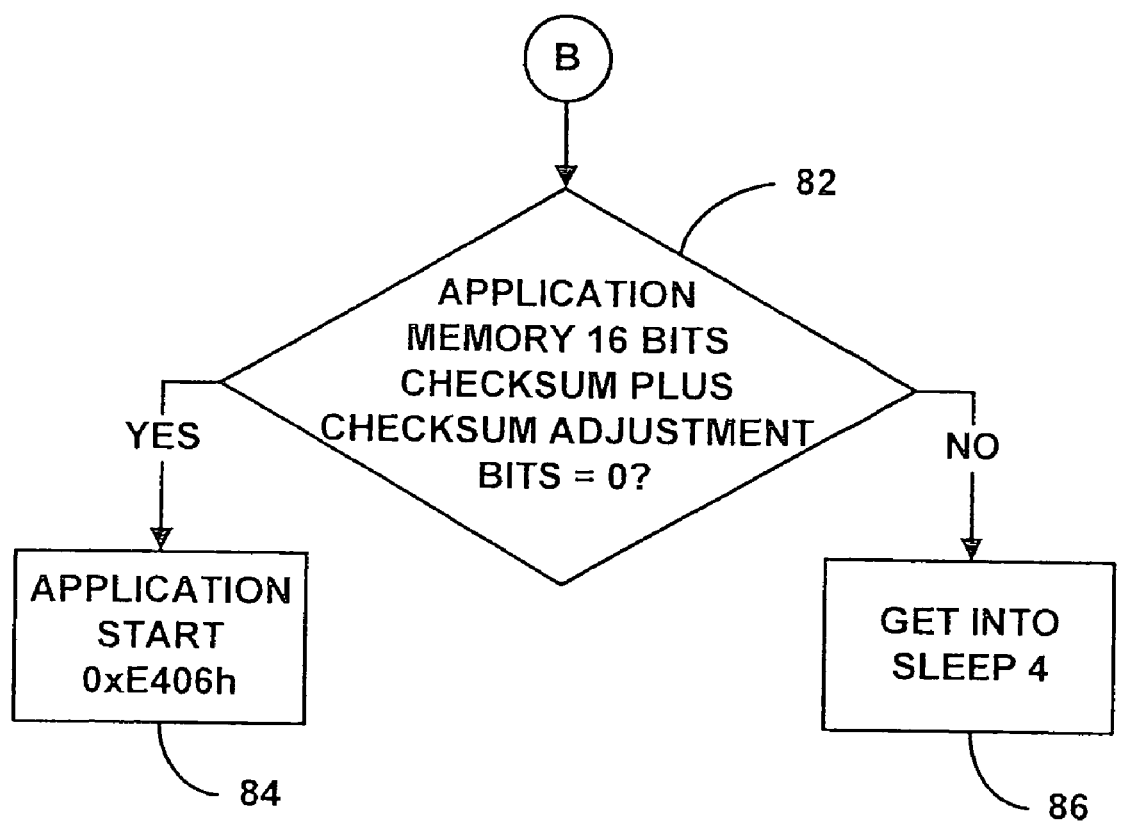

Turning now to FIGS. 2 and 3 and referring generally thereto, one or more components of the system of power tools 10 can have a microprocessor, hereinafter referred to as a microcontroller unit (MCU), with flash memory 20 divided into flash main memory 20A and information memory 20B. Information memory 20B can store a data log 22. Flash main memory 20A, which can include a reset vector 24, can store an application program 26 that governs operation of one or more functional components or functional aspects of the one or more power tool system components. Flash main memory 20A also can store a boot loader 28 that can read out, as data 29, all or part of the data log 22, application program 26, or boot loader 28. Boot loader 28 can also overwrite all or part of the data log 22 or application program 26. Accordingly, upon power up of the one or more power tool system components, any parts of the flash memory 20 can be read out, and many parts of the flash memory can be erased or overwritten.

The boot loader 28 provides a real Read-While-Write Self-Programming mechanism for downloading and uploading program code by the MCU itself. Thus, the boot loader 28 can update the firmware in power tool products and/or save the products from firmware errors. Reading of data 29 from the MCU also can be performed for extraction of data logging information.

It should be readily understood that this boot loader feature allows flexible application software updates controlled by the MCU using a flash-resident boot loader program. The boot loader program can use any available data interface and associated protocol to read code and write (program) that code into the flash memory, or read the code from the program memory. Also, the size of the boot loader memory can be configurable with fuses, and the boot loader can have two separate sets of boot lock bits which can be set independently. Thus, the user is given a unique flexibility to select different levels of protection.

Flash memory 20 can have n segments of main memory and two segments of information memory (A and B) of 128 bytes each. Each segment in main memory can be 512 bytes in size. Segments 0 to n of the main memory 20A can be erased in one step, or each segment can be individually erased. Segments A and B can be erased individually, or as a group with segments 0-n. Segments A and B are also called information memory 20B. New devices can have some bytes programmed in the information memory (needed for test during manufacturing). Thus, a user can perform an erase of the information memory prior to the first use.

The application program 26 can be stored in one or more application segments 26A, which can include segments (0-13). Two boot loader segments 28A, such as segments (14 and 15) can be reserved for storing the boot loader 28. The boot loader 28 can be responsive to a set of commands that call its predetermined functions. For example, a set add command 'A' can set a flash memory address to be read out, written to, and/or erased. Additionally, an erase command 'E' can erase any or all of flash memory segments (0-13), and information segments (A and B). Also, a write command 'F' can write data to any or all of flash memory segments (0-13) and information segments (A and B). Further, a read out command 'G' can read out any or all of flash memory segments (0-13), boot loader segments (14 & 15), and information segments (A and B).

The aforementioned reading or writing can occur over a one-wire interface via a connector to the outside world. The one-wire interface saves need for many external contacts. This wire/connector of the one or more power tool system components can be dedicated or multiplexed to share functionality, such as temperature signal.

In some embodiments, an Interface Box (IB) 30 can communicate with the one or more power tool system components via a third terminal using a one wire asynchronous communication protocol, such as RS232. The IB 30 can interface the one or more power tool system components with a personal computer (PC) 32 reading out the data 29 from the flash memory 20 or sending new program information 36 to overwrite segments of the flash memory 20. To this end, the PC can have a program, such as a visual basic program, that provides an information readout and update module 36 to generate the commands 34 in order to retrieve the data 29 for storage or display via user interface 38, erase memory 20, and/or write new programming information 40 to memory 20. IB 30 can have an information readout and update interface module 42 to relay commands 34 and data 29 between PC 32 and boot loader 28. However, in order for the interface module 42 and the boot loader 28 to become operational and mutually communicate, it can first be necessary for interface initialization module 44 and boot loader initialization module 46 to perform calibration and authentication procedures.

Interface initialization module 44 and boot loader initialization module 46 can each have calibration modules 48A and 48B that permit them to asynchronously communicate over the one wire interface. It should be readily understood that this calibration procedure can be used by any two power tool system components to enable the components to communicate with one another asynchronously over one wire. For example, a battery pack can talk to a charger to get charger information such as a random number, stack voltage, and current value, and to send commands to the charger to control charging current and status. There can be only one third terminal connecting the battery pack and charger, and this 1-wire communication interface can be reliable, and can auto-calibrate itself. Further, when the communication line crashes, it can automatically recover itself.

The 1-wire communication is an asynchronous communication protocol, and a communication command between a charger and battery can be composed of four bytes. The first byte can be a calibration byte, the second byte can be a command byte, the third byte can be a data byte, and the last byte can be a Cyclic Redundancy Check (CRC) byte. The calibration byte can be 16 bits low, the other three bytes can be composed of 10 bits, with 1 low start bit, 8 data bits, and 1 high stop bit.

A choice of 16 bits low as the calibration byte and the command pack start byte can be useful in the context in which a correct command byte always has one high stop bit, so that 16 bits low is unique. First, the charger can calibrate its baud rate base on this 16 bits low. Second, the charger can receive only a valid 16 bits low as the command pack start byte. In other words, this 16 bits low can be used to synchronize the command pack. The charger can determine that the command pack is correct when it receives a correct calibration byte, and when the command pack passes the CRC byte checking. If a communication pack crashes, the charger can look for the next 16 bits low calibration byte.

Referring now generally to FIGS. 2, 4, and 5a-5c, the interface initialization module 46 can start its initialization process by performing a few basic procedures at step 60 to prepare for the initialization. These procedures can include disabling an interrupt, stopping a watchdog, setting up a clock, and delaying for a period of time, such as ten milliseconds, for stability. "Watchdog" can be a of function of the microprocessor, and it can be enabled or disabled. If enabled, the watchdog needs to be reset inside a period of time or else the processor will reset itself.

Once the basic procedures are complete, a twenty millisecond window can be set up at step 62. During this window of time, module 46 expects to complete a calibration process carried out by module 48B and an authentication process carried out by module 50A. If the window expires at decision step 64, then module 46 does not go into the boot loader 28, but rather attempts to perform a memory check and enter the application.

It should be readily understood that the calibration procedure described above can be employed with the IB 30 and the one or more power tool system components. For example, the calibration modules 48a and 48B can look for the 16 bits low calibration bytes in order to set their baud rates for extracting the command bytes, data bytes, and CRC bytes. At startup, the boot loader initialization module 48B can begin the process by sending its command pack to the IB 30, including the 16 bits calibration byte 'CB' at step 66 along with a ping command 'I' asking the IB 30 which mode it should enter and a CRC check byte 'CRC' at step 68. The command 'I' can be sent twice, once in the command byte and once in the data byte. The CRC byte can be dependent on the contents of the command byte and the data byte that accompany it. The IB 30 can, at step 70, recognize the calibration byte and use it to calibrate interpretation of the command byte, data byte, and CRC check byte. Then, the IB 30 can reply by sending a command pack that includes a command 'B' that instructs the boot loader initialization module 46 to get into boot loader mode, and its own CRC check byte 'CRC'. Once this calibration process has taken place, the IB 30 and the one or more power tool system components can exchange commands and data without further calibration bytes.

Upon receipt of the instruction to get into boot loader mode at decision step 72, the calibration process is complete, and the authentication process can be entered at step 74. In step 74, authentication module 50A of the boot loader initialization module 46 can send a query command 'PW?' asking the IB 30 for a predefined password 'PW'. This predefined password 'PW' can be stored in memory 52A of the IB 30 and in memory 52B of the one or more power tool system components. Upon receipt of the query command 'PW?', authentication module 50B can, at step 70, retrieve the password 'PW' from memory 52A and communicate it to authentication module 50A, where it can be compared against a record of the password 'PW' in memory 52B in step 74. Upon confirmation of receipt of the correct password 'PW' from IB 30 at step 74, authentication module can, at step 76, send back a mode switch acknowledgement command 'S' to inform the IB 30 that the boot loader mode is being entered. Then, the boot loader initialization module 46 can enter the boot loader 28 process mode, and the IB 30 can enter an information read out and update interface process carried out by module 42.

Module 42 can inform module 36 when the initialization is complete, and a notification can be output to a user by user interface 38. The user can then interact with module 36 to read out data 29 from flash memory 20 by sending appropriate commands. This data can be presented to the user by user interface 38 and/or stored in memory. The user can alternatively or additionally instruct module 36 to update flash memory 20 with new programming information 40. During these processes, module 42 can simply receive commands 34 from module 36 and pass them along to boot loader 28 at steps 78. Module 42 can also receive data 29 from boot loader 28 and pass it along to module 36. Boot loader 28 receives commands 34 from module 42 and performs the designated actions at steps 80. When writing, checksum protection can be incorporated to confirm correct data. For example, the boot loader can get one segment data stream from module 42 and use the checksum to check the data stream before altering the target memory.

When boot loader 28 receives a command from module 42 that is not one of the known commands 34, it then exits to a final check mode which automatically calculates a checksum adjustment byte and compares it with a checksum adjustment byte in the flash memory 20 at decision step 82. This checksum adjustment word is prewritten into the flash memory 20, and it is a value that makes the whole flash memory 20 equal to zero. It is rewritten every time the application code is updated. When the boot loader 28 programs the flash memory 20, it calculates a hex file, gets the checksum adjustment word, and writes it into flash memory 20. If the two 16 bit checksum adjustment words are equal, the boot loader 28 jumps to the application code section at step 84. Otherwise it goes into deep sleep mode at step 86. This check can also be performed whenever communication fails. Thus, another level of security protects the application code from malfunction.

In some embodiments, an update process can be accomplished by a user taking a battery pack charger to a service location. The application for the charger can then be updated at the service location. Subsequently, the user can plug the battery pack into the battery pack charger and cause the battery pack application code to be updated. Similarly, the battery pack charger an/or the battery pack can update the application code of a power tool. Thus, the battery pack charger can be provided with and store the application code for the battery pack and/or the power tool, and can operate as the interface. First, the charger can talk to the battery pack to check the code version or checksum. Second, if the battery pack application code needs to be updated, the charger can instruct the battery pack to get into boot loader mode, update the battery pack application code, and then process the normal charger application code to charge the battery.

The above description is merely exemplary in nature and is not intended to limit the present disclosure, application, or uses.

What is claimed is:

1. A power tool system component, comprising:
a microprocessor;
a one wire communication terminal connecting said microprocessor to an external device;
a flash memory storing an application program governing operation of an application mode during which said power tool system component is operated and a boot loader program governing operation of a boot loader mode during which at least part of the application program can be updated;
wherein said microprocessor accesses said flash memory and implements the boot loader program and the application program by: (a) setting up and observing a temporal window during which one or more predetermined conditions must be met for the boot loader mode to be entered, wherein the predetermined conditions include successful completion of a calibration process that includes sending a calibration byte to the external device according to a format predetermined to allow the external device to adjust its baud rate for sending and receiving information; and (b) upon successful completion of the conditions within the temporal window, sending a confirmation to the device that the conditions have been satisfied and entering the boot loader mode.

2. The power tool system component of claim 1, wherein said microprocessor, in response to a command from the device, performs a flash memory checking process.

3. The power tool system component of claim 2, wherein said microprocessor, upon successful completion of the flash memory checking process, enters the application mode.

4. The power tool system component of claim 2, wherein said microprocessor, upon failure of the flash memory checking process, enters a deep sleep mode.

5. The power tool system component of claim 2, wherein said microprocessor performs the flash memory checking process by calculating a checksum based on contents of the flash memory, performing a comparison of the checksum with a value prewritten into the flash memory, and determining whether the flash memory checking process is successfully completed based on the comparison.

6. The power tool system component of claim 1, wherein said microprocessor performs the calibration process by sending to the device a query asking for instructions regarding which mode to enter, sending to the device a check byte confirming the query, and receiving from the device a command to enter a boot loader mode.

7. The power tool system component of claim 1, wherein the predetermined conditions include successful completion of an authentication process in which said microprocessor sends to the device a query for a predetermined password, receives the password from the device, performs a comparison of the password received from the device with a record of the password stored in memory, and determines whether the authentication process is successfully completed based on the comparison.

8. The power tool system component of claim 1, wherein said power tool system component is at least one of a power tool, a battery pack, or a battery pack charger.

9. The power tool system component of claim 1, wherein said external device is at least one of:
  (a) a computer processor having a data store of new programming information to be written to the flash memory, and operable to generate the commands in order to write the new programming information to the flash memory; or
  (b) an interface box connecting the computer processor and the power tool system component and operable to relay commands and data between the computer processor and the power tool system component.

10. A method of operation for use with a power tool system component, comprising:
  setting up and observing a temporal window during which predetermined conditions must be met for a boot loader mode to be entered, wherein the predetermined conditions include successful completion of a calibration process that includes sending a calibration byte to a device operable to adjust its baud rate for sending and receiving information;
  upon successful completion of the conditions within the temporal window, sending a confirmation to the device that the conditions have been satisfied and entering the boot loader mode;
  during the boot loader mode, receiving commands from the device and responding to the commands by reading data from flash memory segments, writing data to flash memory segments, and reading checksums.

11. The method of claim 10, further comprising, in response to a command from the device, performing a flash memory checking process.

12. The method of claim 11, further comprising, upon successful completion of the flash memory checking process entering the application mode.

13. The method of claim 11, further comprising, upon failure of the flash memory checking process, entering a deep sleep mode preventing operation of the power tool system component.

14. The method of claim 11, wherein the flash memory checking process includes:
  calculating a checksum based on contents of the flash memory;
  performing a comparison of the checksum with a value prewritten into the flash memory; and
  determining whether the flash memory checking process is successfully completed based on the comparison.

15. The method of claim 10, wherein the calibration process further includes:
  sending to the device a query asking for instructions regarding which mode to enter;
  sending to the device a check byte confirming the query; and
  receiving from the device a command to enter a boot loader mode.

16. The method of claim 10, wherein the predetermined conditions include successful completion of an authentication process that includes:
  sending to the device a query for a predetermined password;
  receiving the password from the device;
  performing a comparison of the password received from the device with a record of the password stored in memory; and
  determining whether the authentication process is successfully completed based on the comparison.

17. The method of claim 10, wherein the power tool system component is at least one of a power tool, a battery pack, or a battery pack charger.

18. The method of claim 10, wherein the device is at least one of:
  (a) a computer processor having a data store of new programming information to be written to the flash memory, and operable to generate the commands in order to write the new programming information to the flash memory; or
  (b) an interface box connecting the computer processor and the power tool system component and operable to relay commands and data between the computer processor and the power tool system component.

19. A power tool system component application program updating system, comprising:
  a power tool system component having a microprocessor and a flash memory storing an application program governing operation of an application mode during which said power tool system component is operated and a boot loader program governing operation of a boot loader mode during which at least part of the application program can be updated;
  a computer processor having an information readout and update module: (a) accessing a datastore of programming information for updating an application program stored in flash memory of a power tool system component; and (b) generating commands instructing the boot loader program to read out data from segments of the flash memory and write data to segments of the flash memory;
  an interface box connecting the computer processor and the power tool system component and operable to relay the commands and the data between the computer processor and the power tool system component,
  wherein said microprocessor accesses said flash memory and implements the boot loader program and the application program by: (a) setting up and observing a temporal window during which one or more predetermined conditions must be met for the boot loader mode to be entered, wherein the predetermined conditions include successful completion of a calibration process that includes sending a calibration byte to the interface according to a format predetermined to allow the interface box to adjust its baud rate for sending and receiving information; and (b) upon successful completion of the conditions within the temporal window, sending a confirmation to the interface box that the conditions have been satisfied and entering the boot loader mode.

20. The power tool system component of claim 19,
  wherein said microprocessor further performs the calibration process by sending to the device a query asking for instructions regarding which mode to enter, sending to the device a check byte confirming the query, and receiving from the device a command to enter a boot loader mode,
  wherein said microprocessor, in response to a command from said interface box, performs a flash memory checking process by calculating a checksum based on contents of the flash memory, performing a comparison of the checksum with a value prewritten into the flash memory, and determining whether the flash memory checking process is successfully completed based on the comparison, and, depending on successful completion of the flash memory checking process, either enters the application mode or enters a deep sleep mode preventing operation of the power tool system component, wherein the predetermined conditions include successful completion of an authentication process in which said microprocessor sends to the device a query for a predetermined password, receives the password from the device, performs a comparison of the password received from the device with a record of the password stored in memory, and determines whether the authentication process is successfully completed based on the comparison, and wherein said power tool system component is at least one of a power tool, a battery pack, or a battery pack charger.

* * * * *